(12) United States Patent
Robinson et al.

(10) Patent No.: US 10,936,147 B2
(45) Date of Patent: Mar. 2, 2021

(54) TABLET COMPUTING DEVICE WITH DISPLAY DOCK

(71) Applicant: Hewlett-Packard Development Company, L.P., Spring, TX (US)

(72) Inventors: Ian N Robinson, Palo Alto, CA (US); Nathan Nuber, Fort Collins, CO (US); Kevin Kowalski, Fort Collins, CO (US); Ashton Ondra, Fort Collins, CO (US); Derek Showers, Fort Collins, CO (US); Robert Paul Martin, Fort Collins, CO (US); Ron Y Zhang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 4 days.

(21) Appl. No.: 16/486,235

(22) PCT Filed: Apr. 28, 2017

(86) PCT No.: PCT/US2017/030129
§ 371 (c)(1),
(2) Date: Aug. 15, 2019

(87) PCT Pub. No.: WO2018/199983
PCT Pub. Date: Nov. 1, 2018

(65) Prior Publication Data
US 2020/0042157 A1 Feb. 6, 2020

(51) Int. Cl.
*G06F 3/0481* (2013.01)
*G02B 27/01* (2006.01)
*G06F 1/16* (2006.01)
*G06F 3/01* (2006.01)
*G06T 19/00* (2011.01)

(52) U.S. Cl.
CPC ..... *G06F 3/04815* (2013.01); *G02B 27/0172* (2013.01); *G06F 1/1626* (2013.01); *G06F 1/1632* (2013.01); *G06F 3/011* (2013.01); *G06T 19/006* (2013.01); *G06F 2200/1632* (2013.01)

(58) Field of Classification Search
None
See application file for complete search history.

(56) References Cited

U.S. PATENT DOCUMENTS 7,557,816 B2    7/2009  Kuroki
2012/0113140 A1  5/2012  Hilliges et al.
2012/0249463 A1* 10/2012  Leung ................ G06F 3/04886
                                              345/173

(Continued)

OTHER PUBLICATIONS

Wang, J. et al., Coordinated 3D Interaction in Tablet- and HMD-based Hybrid Virtual Environments, Oct. 4-5, 2014,< http://dl.acm.org/citation.cfm?id=2659777 >.

*Primary Examiner* — Said Broome
(74) *Attorney, Agent, or Firm* — HP Inc. Patent Department

(57) ABSTRACT

An input system for a 3D display device includes a pen, and a tablet computing device to receive input via interaction with the pen. The tablet computing device including a display dock to dock the 3D display device and a pen dock to dock the pen, wherein docking of the 3D display device in the display dock facilitates a determination of a display position of a visual representation of the tablet computing device on the 3D display device.

15 Claims, 5 Drawing Sheets

(56) References Cited

U.S. PATENT DOCUMENTS

| | | |
|---|---|---|
| 2014/0267673 A1 | 9/2014 | Yamamoto et al. |
| 2014/0320383 A1 | 10/2014 | Goto et al. |
| 2015/0363980 A1* | 12/2015 | Dorta .................... G06T 19/20 345/419 |
| 2015/0364113 A1 | 12/2015 | Ahn et al. |
| 2016/0196694 A1 | 7/2016 | Lindeman |
| 2016/0335801 A1 | 11/2016 | Yoon et al. |

* cited by examiner

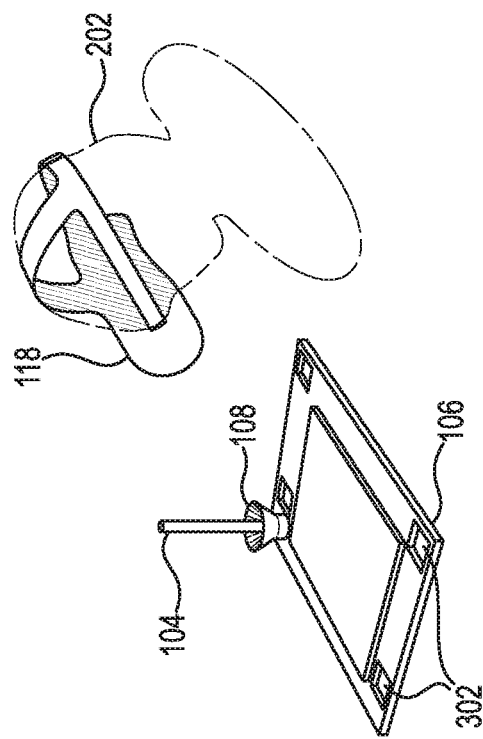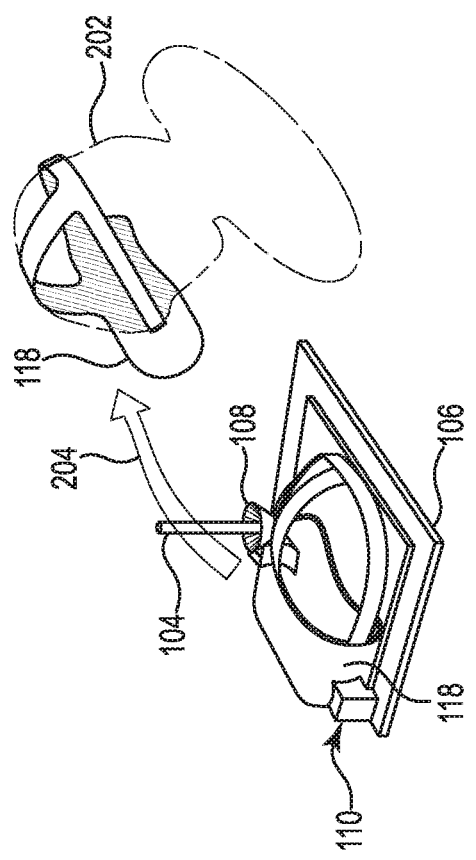
Fig. 2
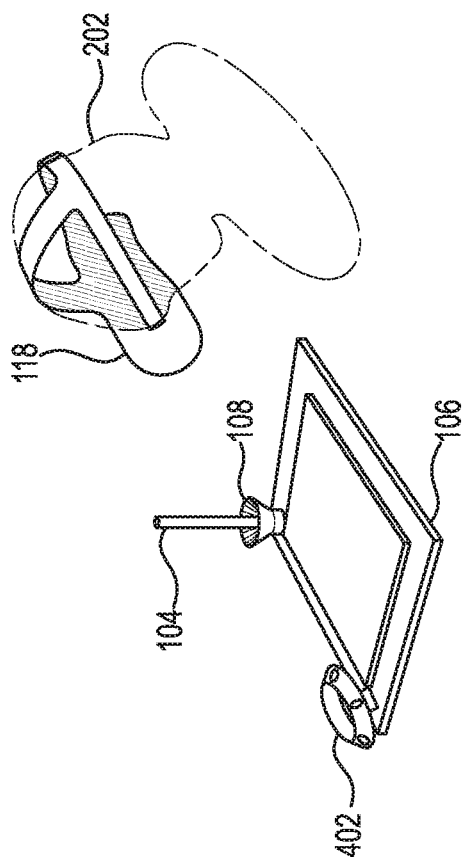
Fig. 3
Fig. 4

TABLET COMPUTING DEVICE WITH DISPLAY DOCK

BACKGROUND

Pens used in conjunction with tablet computing devices provide a natural and intuitive way for users to input precise shaping information into content creation applications. This holds true for applications running in virtual reality (VR) systems also.

BRIEF DESCRIPTION OF THE DRAWINGS

FIG. 2 is a diagram illustrating a perspective view of the input and display system shown in FIG. 1 according to one example.

FIG. 3 is a diagram illustrating a perspective view of the input and display system shown in FIG. 1 according to another example.

FIG. 4 is a diagram illustrating a perspective view of the input and display system shown in FIG. 1 according to yet another example.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Pens used in conjunction with tablet computing devices provide a natural and intuitive way for users to input precise shaping information into content creation applications. This holds true for applications running in virtual reality (VR) systems also, but their use may be made difficult by the fact that the position, orientation and extents of the tablet computing device and pen are not visible when the user is in the VR environment. This impacts: (a) the user's ability to locate the pen to pick it up; (b) the user's ability to know where the tablet computing device is to use the pen on it; and (c) the system's ability to superimpose content to coincide with the tablet computing device.

Some examples disclosed herein involve augmenting the tablet hardware so that visual representations of the tablet computing device and pen can be generated for use in the VR environment. Some examples cover a number of different VR system tracking implementations. Some examples do not use any position and orientation tracking sensors on the tablet computing device, but rather provide tablet hardware that enables tablet use in VR with position sensing solely on the VR headset. In some examples, the tablet computing device includes docking hardware that provides repositories for the pen and the VR headset. The tablet computing device senses placement of the pen in a pen dock, and a representation of the docked pen in the VR environment facilitates finding the pen when the VR headset is being worn by a user. The representation of the pen in the VR environment (and, in some examples, a representation of the user's hand) provides visual feedback within the VR environment when the pen is in use.

Figure 1:
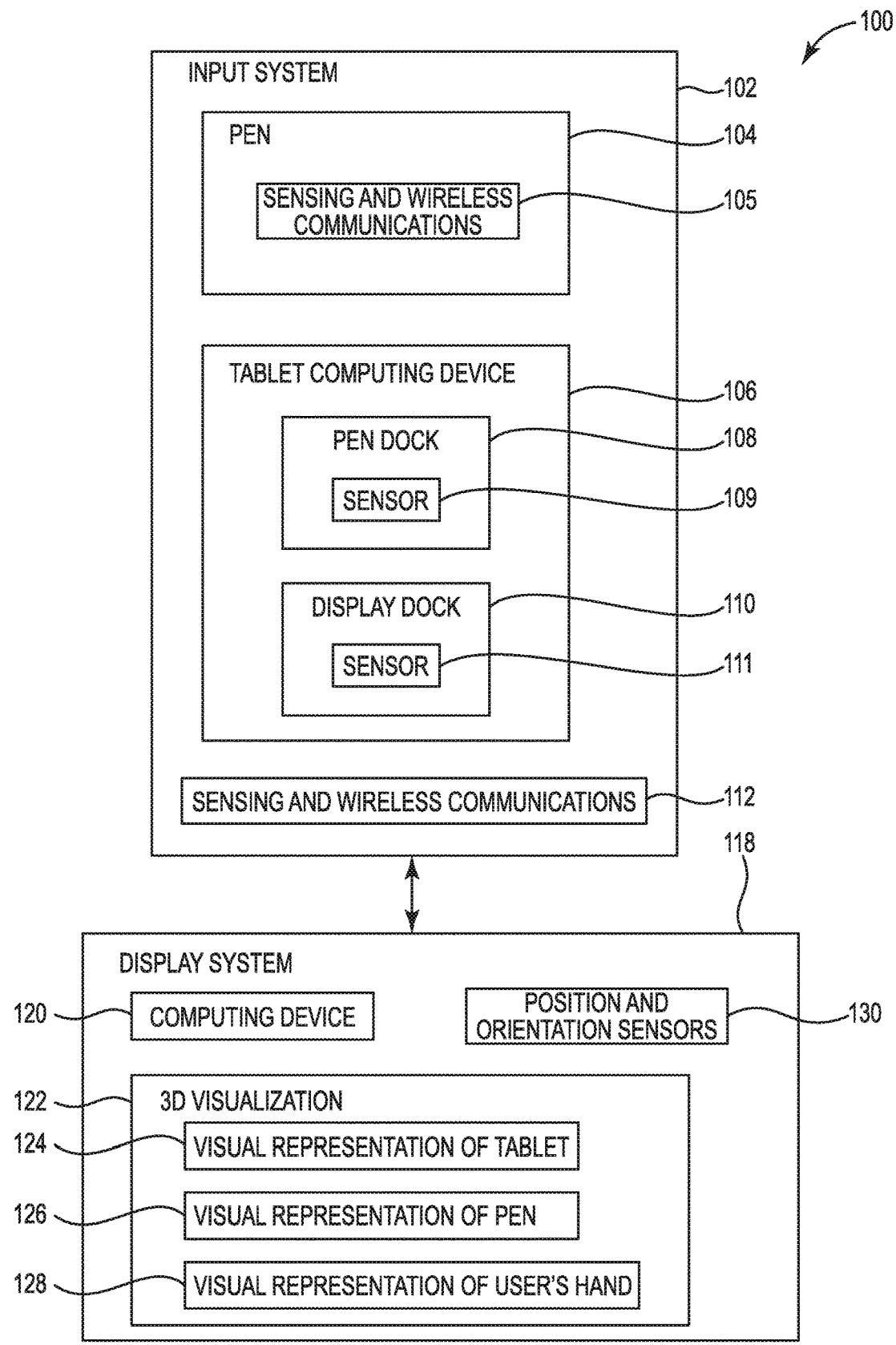
FIG. 1 is a block diagram of an input and display system according to one example.

FIG. 1 is a block diagram of an input and display system 100 according to one example. The system 100 includes an input system 102, and a display system 118 communicatively coupled to the input system 102. The input system 102 includes a pen 104 and a tablet computing device 106. The tablet computing device 106 includes a pen dock 108 and a display dock 110. The input system 102 is used by a user to input information for display on the display system 118.

In one example, the display system 118 is a VR or AR display system, or other 3D output system. The display system 118 includes a computing device 120, and generates a 3D visualization 122. The 3D visualization 122 includes a 3D visual representation 124 of the tablet computing device 106, a 3D visual representation 126 of the pen 104, and a 3D visual representation 128 of a user's hand.

The display system 118 may be any system that implements a viewing surface to represent the 3D visualization 122. In an example, the display system 118 is a head-mounted display (HMD) such as a virtual reality (VR) headset implementing stereoscopic images called stereograms to represent the 3D visualization 122. The 3D visualization 122 may include still images or video images. The VR headset may present the 3D visualization 122 to a user via a number of ocular screens. In an example, the ocular screens are placed in an eyeglass or goggle system allowing a user to view both ocular screens simultaneously. This creates the illusion of a 3D visualization 122 using two individual ocular screens.

The display system 118 may further include position and orientation sensors 130, such as a gyroscopic device, an accelerometer, a magnetometer, and other tracking devices. The sensors 130 may be used to detect the position and orientation of the display system 118 in 3D space as the display system 118 is positioned on the user's head. The sensors 130 may provide this data to a processor in the computing device 120 such that movement of the display system 118 as it sits on the user's head is translated into a change in the point of view within the 3D visualization 122.

Although one example uses a VR headset to present the 3D visualization 122, other types of environments may also be used. In an example, an AR environment may be used where aspects of the real world are viewable in a visual representation while a 3D object is being drawn within the AR environment. Thus, much like the VR system described herein, an AR system may include a visual presentation provided to a user via a computer screen or a headset including a number of screens, among other types of devices to present the 3D visualization 122. Thus, the present description contemplates the use of not only a VR environment but an AR environment as well.

The pen 104 may be any type of elongated device that a user may hold and touch to a surface such as an active area of the tablet computing device 106. In an example, the pen 104 is a passive or capacitive stylus in that the stylus acts just like a human finger when touching a touch-sensitive screen, for example. In this example, no electronic communication is present between the passive stylus and a device such as the tablet computing device 106. In another example, the pen 104 is an active stylus or smart pen in that the pen 104 includes sensing and wireless communication elements 105 that communicate with a touchscreen controller on a device such as the tablet computing device 106. During use, a user may implement the pen 104 against or near the tablet computing device 106 in order to have input received and presented on the 3D visualization 122.

The tablet computing device 106 may detect the position of the pen 104 as it is touched at an active surface of the tablet computing device 106. The tablet computing device 106 may then relay information regarding the location of the pen 104 on the tablet computing device 106 to the display system 118 using sensing and wireless communications elements 105. As the user's hand moves the pen 104 on the tablet computing device 106, the visual representations 126 and 128 are correspondingly moved. Thus, the user may, in real time, create and see input created. This allows a user to manipulate the 3D visualization 122 and the 3D objects created therein to create or augment the 3D objects. The tablet computing device 106 may also include tablet buttons (e.g., "quick keys") that include touch sensors, which enables the system 100 to provide visual feedback to the user in the 3D visualization 122 that the user's finger is over a particular button before the user presses the button.

The pen 104 or the tablet computing device 106 may relay position and orientation information for the pen 104 to the display system 118 via elements 105 and 112. The sensing and wireless communications elements 105 of the pen 104 may include a number of orientation determination devices. The orientation determination devices may include, for example, gyroscopes, accelerometers, magnetometers, other orientation-determining devices, and combinations thereof, and may determine the tilt direction, tilt angle from a normal surface of the writing substrate, acceleration, rotation of the pen 104 about a longitudinal axis of the pen 104, other orientation information, and combinations thereof. The orientation determination devices may be continuously calibrated each time the pen 104 is brought in contact with the tablet computing device 106. Once received, the orientation data may be processed by the computing device 120 of the display system 118 to create the visual representation 126 of the pen 104, and the visual representation 128 of the user's hand. The visual representation 126 of the pen 104 may include a representation of an orientation of the pen 104 based on the orientation data. This enhances the 3D interaction, and provides the ability to generate a more realistic visual representation 126 of the pen 104, even when the pen 104 is not in contact with the tablet computing device 106.

In one example, the various subcomponents or elements of the system 100 may be embodied in a plurality of different systems, where different modules may be grouped or distributed across the plurality of different systems. To achieve its desired functionality, the computing devices 106 and 120 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

The data storage devices of computing devices 106 and 120 may include various types of memory modules, including volatile and nonvolatile memory. For example, the data storage devices may include Random Access Memory (RAM), Read Only Memory (ROM), and Hard Disk Drive (HDD) memory. Many other types of memory may also be utilized, and the present specification contemplates the use of many varying type(s) of memory in the data storage devices as may suit a particular application. In certain examples, different types of memory may be used for different data storage needs. For example, in certain examples, the processing devices may boot from Read Only Memory (ROM), maintain nonvolatile storage in Hard Disk Drive (HDD) memory, and execute program code stored in Random Access Memory (RAM).

The data storage devices described herein may include a computer readable medium, a computer readable storage medium, or a non-transitory computer readable medium, among others. For example, the data storage devices may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

FIG. 2 is a diagram illustrating a perspective view of the input and display system 100 shown in FIG. 1 according to one example. The example input and display system implementation shown in FIG. 2 is identified by reference number 100-1. As shown in FIG. 2, the tablet computing device 106 includes a pen dock 108 for docking the pen 104, and a display dock 110 for docking the display system 118, which is a VR headset in the illustrated example.

In some examples, the pen dock 108 holds the pen 104 in a known position and orientation. In the example shown in FIG. 2, the pen dock 108 has an inkwell-like arrangement with a wide, funnel like opening that guides the pen 104 into place. Sensing that the pen 104 is in the pen dock 108 may be achieved by sensor 109 (FIG. 1), which, for example, may be a mechanical switch or a photoelectric or Hall Effect sensor. This sensing may also be accomplished by positioning the pen dock 108 such that the docked pen 104 registers on a portion of the active area of the tablet computing device 106. In one example, the pen dock 108 includes or is coupled to a battery charger for recharging the pen 104.

The display dock 110 holds the display system 118 in a known, fixed position and orientation with respect to the tablet computing device 106. In some examples, the display dock 110 includes a sensor 111 (FIG. 1), such as a mechanical or Hall-Effect sensor, that provides a signal to the tablet computing device 106 indicating whether the display system 118 is docked. When the tablet computing device 106 detects that the display system 118 is docked in the display dock 110, the tablet computing device 106 may record the current position and orientation of the display system 118 and relay this position and orientation information to the display system 118 to subsequently identify the position in the 3D visualization 122 (FIG. 1) where the visual representation 124 of the tablet computing device 106 should be rendered.

After docking the display system 118 in the display dock 110, the user 202 may then remove the display system 118 from the dock 110, and place the display system 118 on the user's head, as indicated by arrow 204. In examples where the display system 118 is not spatially tracked (e.g., a VR headset that tracks orientation, but not position), the display dock 110 may be used to at least supply a starting orientation. In some examples, the tablet computing device 106 is assumed to be placed at a default, and user-adjustable location with respect to the starting orientation of the display system 118. In one example, the display dock 110 includes or is coupled to a battery charger for recharging the display system 118.

If the display system 118 includes additional components whose position and orientation are tracked by the system 118, e.g., hand controllers, then one or more of those components may be substituted for the display system 118 in the above.

After the display system 118 has been docked, the display system 118 can then detect and place the visual representation 124 of the tablet computing device 106 in its local coordinate space in the 3D visualization 122. Similarly, after the pen 104 has been docked, the display system 118 can then detect and place the visual representation 126 of the docked pen 104 in its local coordinate space in the 3D visualization 122, making it easier for the user to find the pen 104 when the user is wearing the display system 118. In some examples, the positioning of the visual representation 126 of the pen 104 is updated when the pen 104 is in use on the tablet computing device 106, using position information from the tablet computing device 106. Orientation information sensed by the elements 105 of the pen 104 may also be used by the display system 118 to generate a more accurate visual representation 126 of the pen 104. In some examples, the tablet computing device 106 also tracks the position of the pen 104 in the space above the tablet surface, and this tracking is continuously calibrated each time the pen 104 is brought in contact with the tablet computing device 106. This allows 3D interaction, and the ability to supply a visual representation 126 of the pen 104 in the 3D visualization 122 at a location that is continually updated even when the pen 104 is not in contact with the tablet computing device 106.

The physical size of the tablet computing device 106 and the relative spatial locations of its docks 108 and 110 are made known to the application software as part of a set-up procedure, or detected by another technique (e.g., communicated by features of the docks 108 and 110). This enables the display system 118 to generate the 3D visual representation 124 of the tablet computing device 106 corresponding to its physical location. In the case in which the display system 118 is not spatially tracked, the application can provide a method (e.g., via a user interface) for the user to adjust the 3D visual representation 124 to better coincide with the user's perception of the true location of the tablet computing device 106.

Although some examples use position sensors for VR tracking solely on the display system 118, and not on the pen 104 or the tablet computing device 106, other examples may use such position sensors on one or both of the pen 104 and the tablet computing device 106. FIG. 3 is a diagram illustrating a perspective view of the input and display system 100 shown in FIG. 1 according to another example. The example input and display system implementation shown in FIG. 3 is identified by reference number 100-2. In the illustrated example, the tablet computing device 106 includes fiducial markings 302, and the display system 118 includes a camera to capture images of the fiducial markings 302 to determine a position and orientation of the tablet computing device 106 for the 3D visualization 122.

FIG. 4 is a diagram illustrating a perspective view of the input and display system 100 shown in FIG. 1 according to yet another example. The example input and display system implementation shown in FIG. 4 is identified by reference number 100-3. In the illustrated example, the tablet computing device 106 includes VR tracking sensor 402 to track a position and orientation of the tablet computing device 106 for the 3D visualization 122.

Figure 5:
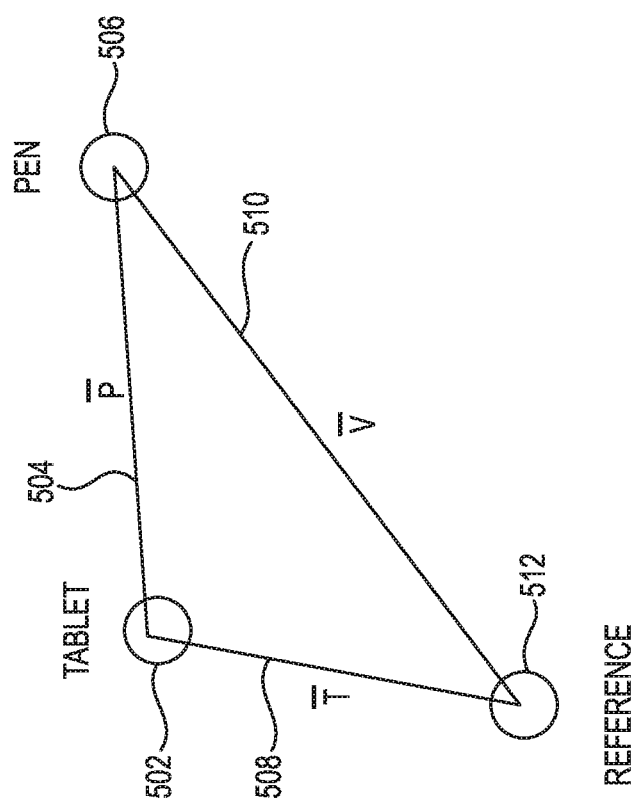
FIG. 5 is a diagram illustrating a method of determining a position in virtual space of the pen of the system shown in FIG. 1 according to one example.

FIG. 5 is a diagram illustrating a method of determining a position in virtual space of the pen 104 of the system 100 shown in FIG. 1 according to one example. In this method, the display system 118 provides a reference point 512, which, for example, may be the coordinate origin for the 3D visualization 122. Tablet point 502 corresponds to the position of the tablet computing device 106, which may be tracked as described above. Pen point 506 corresponds to the position of the pen 104, which, in the illustrated example, is tracked relative to the tablet computing device 106.

Although the position of the pen 104 is not tracked relative to the reference point 512 in the illustrated example, the position of the pen 104 relative to the reference point 512 can be calculated. The position of the tablet computing device 106 relative to the reference point 512 is represented by vector (T) 508. The position of the pen 104 relative to the tablet computing device 106, determined by the position of the pen 104 on the tablet computing device 106 and the orientation of the tablet itself, is represented by vector (P) 504. The position of the pen 104 in virtual space in the 3D visualization 122 is represented by vector (V) 510. Vector V is the combination of vectors T and P: T+P=V.

Figure 6:
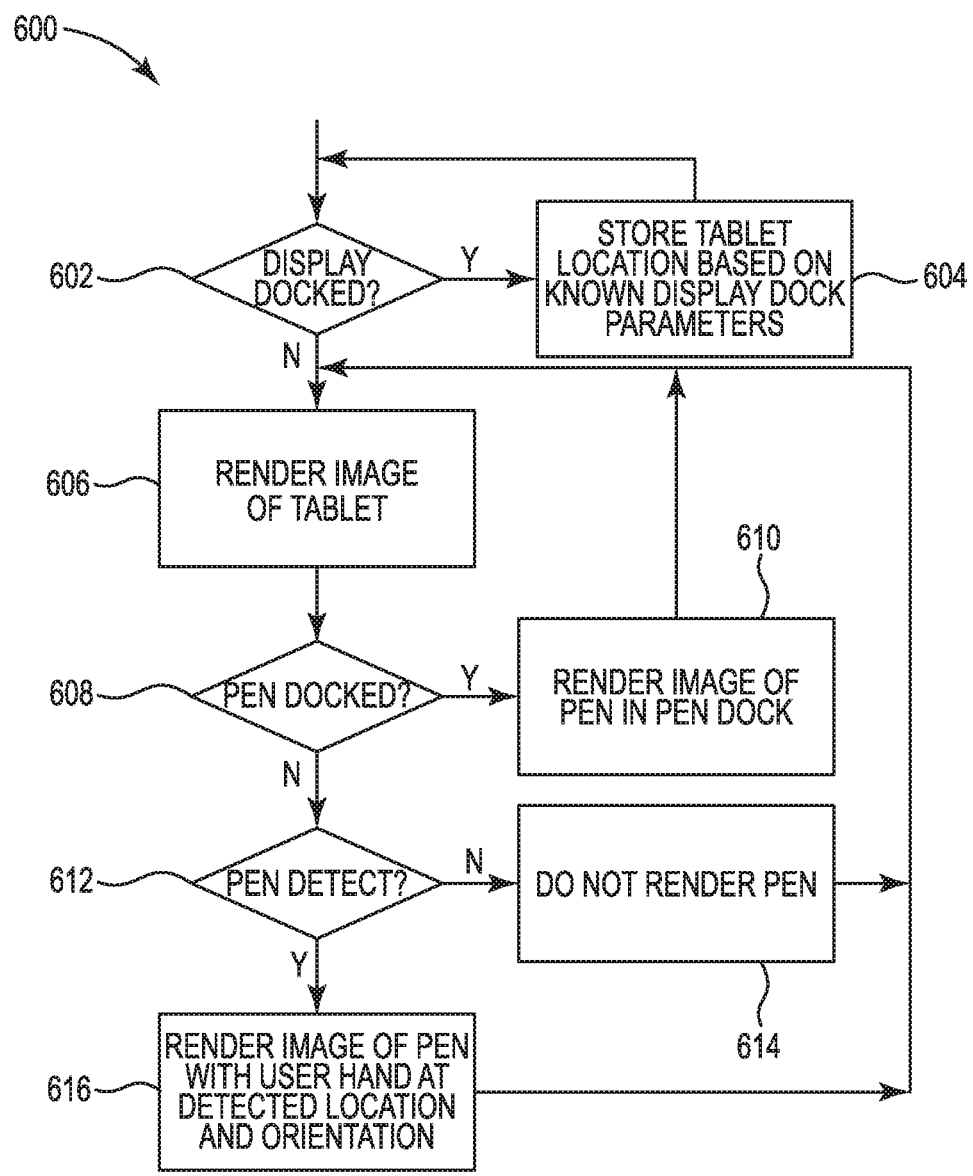
FIG. 6 is a flow diagram illustrating a method for generating visual representations for a 3D visualization using docking information according to one example.

FIG. 6 is a flow diagram illustrating a method 600 for generating visual representations 124, 126, and 128 for a 3D visualization 122 using docking information according to one example. In one example, system 100 performs method 600. At 602 in method 600, the tablet computing device 106 determines whether the display system 118 is docked in the display dock 110. If it is determined at 602 that the display system 118 is docked in the display dock 110, the method 600 moves to 604, where the display system 118 stores tablet location information based on known parameters for the display dock 110, and the method 600 returns to 602. If it is determined at 602 that the display system 118 is not docked in the display dock 110, the method 600 moves to 606, where the display system 118 renders the image or visual representation 124 of the tablet computing device 106 at a location based on the stored tablet location information (stored at 604) and the current location of the display system 118.

At 608 in method 600, the tablet computing device 106 determines whether the pen 104 is docked in the pen dock 108. If it is determined at 608 that the pen 104 is docked in the pen dock 108, the method 600 moves to 610, where the display system 118 renders the image or visual representation 126 of the pen 104 positioned in a rendered representation of the pen dock 108, and the method 600 returns to 606. If it is determined at 608 that the pen 104 is not docked in the pen dock 108, the method 600 moves to 612, where the tablet computing device 106 determines whether the pen 104 has been detected by the tablet computing device 106. If it is determined at 612 that the pen 104 has not been detected, the method 600 moves to 614, which indicates that the visual representation 126 of the pen 104 is not rendered, and the method 600 returns to 606. If it is determined at 612 that the pen 104 has been detected, the method 600 moves to 616, where the display system 118 renders the image or visual representation 126 of the pen 104 and the image or visual representation 128 of the user's hand at a pen location detected by the tablet computing device 106 and a pen orientation detected by the pen 104, and the method 600 returns to 606.

Figure 7:
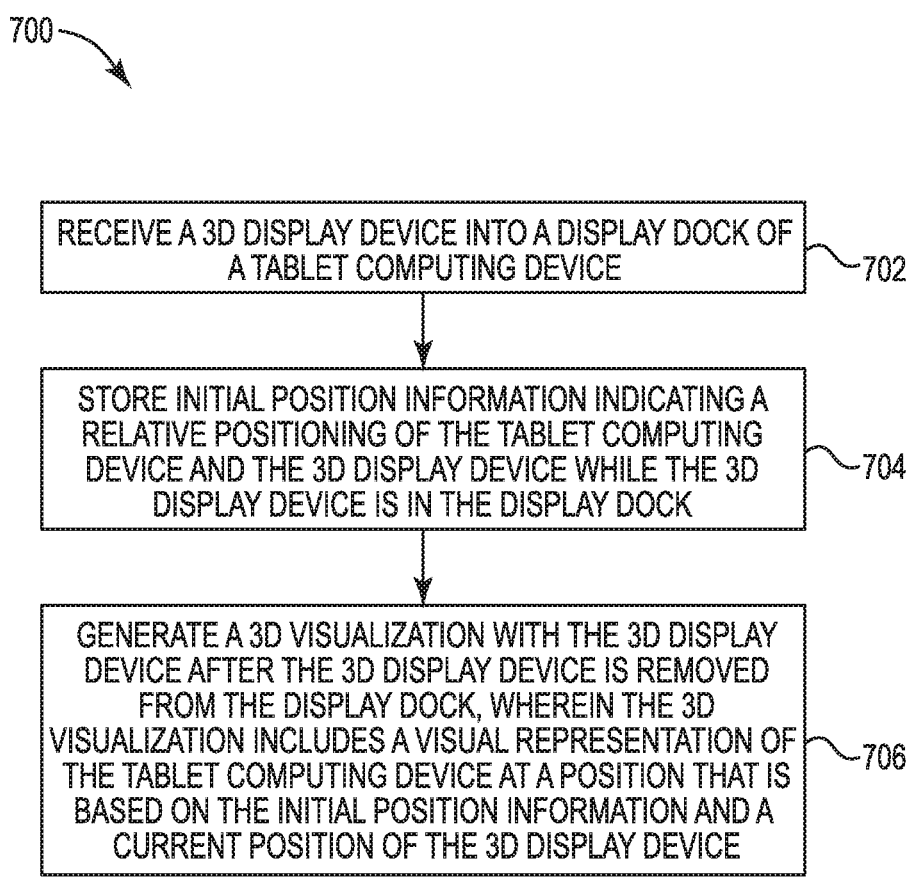
FIG. 7 is a flow diagram illustrating a method for input and display according to one example.

One example is directed to an input and display method. FIG. 7 is a flow diagram illustrating a method 700 for input and display according to one example. At 702 in method 700, a 3D display device is received into a display dock of a tablet computing device. At 704, initial position information indicating a relative positioning of the tablet computing device and the 3D display device while the 3D display device is in the display dock is stored. At 706, a 3D visualization is generated with the 3D display device after the 3D display device is removed from the display dock, wherein the 3D visualization includes a visual representation of the tablet computing device at a position that is based on the initial position information and a current position of the 3D display device.

Method 700 may further include sensing whether a pen has been docked in a pen dock of the tablet computing device, wherein the 3D visualization includes a visual representation of the pen in the pen dock when the pen is sensed as being in the pen dock. Method 700 may further include sensing a current position of the pen with the tablet computing device; and updating the visual representation of the pen based on the sensed current position of the pen. Method 700 may further include sensing with the pen a current orientation of the pen; and updating the visual representation of the pen based on the sensed current orientation of the pen. The 3D visualization in method 700 may include a visual representation of a user's hand interacting with the pen.

In the case of an augmented reality (AR) system, visual representations of the shape and color of the tablet and pen may be redundant. However, the system can use the detected locations and orientations of the tablet and pen to overlay information (e.g., pen pressure displayed on the pen) or UI elements (e.g., menus displayed on the tablet). The term visual representation should be understood to include such augmented views of these components. This additional information can also be generated and used in a VR system.

Another example is directed to an input system for a 3D display device. The input system includes a pen, and a tablet computing device to receive input via interaction with the pen. The tablet computing device includes a display dock to dock the 3D display device and a pen dock to dock the pen, wherein docking of the 3D display device in the display dock facilitates a determination of a display position of a visual representation of the tablet computing device on the 3D display device. Docking of the pen in the pen dock may facilitate a determination of a display position of a visual representation of the pen on the 3D display device. The 3D display device may be a virtual reality (VR) display device. The 3D display device may be a virtual reality (VR) head-mounted display (HMD). The pen dock may include a sensor to sense when the pen is docked in the pen dock. The display dock may include a sensor to sense when the 3D display device is docked in the display dock.

Yet another example is directed to an input and display system. The input and display system includes an input system including a display dock, and a 3D display device communicatively coupled to the input system and dockable in the display dock. The 3D display device presents a visual representation of the input system based on position information that is determined when the 3D display device is docked in the display dock. The input system may include a pen and a tablet computing device to receive input via interaction with the pen. The tablet computing device may include a pen dock to dock the pen and a sensor to sense when the pen is docked in the pen dock. The tablet computing device may include a tablet button with an associated sensor to sense when a user's finger is near the tablet button, and the visual representation of the input system may include a representation of the user's finger positioned near a representation of the tablet button when the sensor senses the user's finger.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An input system for a 3D display device, the input system comprising:
a pen; and
a tablet computing device to receive input via interaction with the pen, wherein the tablet computing device includes a display dock to dock the 3D display device and a pen dock to dock the pen, wherein the tablet computing device is to detect docking of the 3D display device in the display dock, to record a current position and orientation of the 3D display device based on detecting the docking, and to relay the current position and orientation to the 3D display device to facilitate a determination of a display position of a visual representation of the tablet computing device on the 3D display device.

2. The input system of claim 1, wherein docking of the pen in the pen dock facilitates a determination of a display position of a visual representation of the pen on the 3D display device.

3. The input system of claim 1, wherein the 3D display device is a virtual reality (VR) display device.

4. The input system of claim 1, wherein the 3D display device is a virtual reality (VR) head-mounted display (HMD).

5. The input system of claim 1, wherein the pen dock includes a sensor to sense when the pen is docked in the pen dock.

6. The input system of claim 1, wherein the display dock includes a sensor to sense when the 3D display device is docked in the display dock.

7. A method, comprising:
receiving a 3D display device into a display dock of a tablet computing device;
storing initial position information indicating a relative positioning of the tablet computing device and the 3D display device while the 3D display device is in the display dock; and
generating a 3D visualization with the 3D display device after the 3D display device is removed from the display dock, wherein the 3D visualization includes a visual representation of the tablet computing device at a position that is based on the initial position information and a current position of the 3D display device.

8. The method of claim 7, and further comprising:
sensing whether a pen has been docked in a pen dock of the tablet computing device, wherein the 3D visualization includes a visual representation of the pen in the pen dock when the pen is sensed as being in the pen dock.

9. The method of claim 8, and further comprising:
sensing a current position of the pen with the tablet computing device; and
updating the visual representation of the pen based on the sensed current position of the pen.

10. The method of claim 9, and further comprising:
sensing with the pen a current orientation of the pen; and
updating the visual representation of the pen based on the sensed current orientation of the pen.

11. The method of claim 8, wherein the 3D visualization includes a visual representation of a user's hand interacting with the pen.

12. An input and display system, comprising:
an input system including a display dock; and
a 3D display device communicatively coupled to the input system and dockable in the display dock, the 3D display device to determine initial position information for the input system in a local coordinate space based on docking of the 3D display device in the display device and to present a visual representation of the input system based on the initial position information and a current position of the 3D display device.

13. The input and display system of claim 12, wherein the input system includes a pen and a tablet computing device to receive input via interaction with the pen.

14. The input and display system of claim 13, wherein the tablet computing device includes a pen dock to dock the pen and a sensor to sense when the pen is docked in the pen dock.

15. The input and display system of claim 13, wherein the tablet computing device includes a tablet button with an associated sensor to sense when a user's finger is near the tablet button, and wherein the visual representation of the input system includes a representation of the user's finger positioned near a representation of the tablet button when the sensor senses the user's finger.

* * * * *